United States Patent
Furka

(10) Patent No.: US 7,996,333 B2
(45) Date of Patent: Aug. 9, 2011

(54) MANIFEST DELIVERY SYSTEM AND METHOD

(75) Inventor: Peter Furka, Secaucus, NJ (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 12/104,237

(22) Filed: Apr. 16, 2008

(65) Prior Publication Data

US 2008/0294474 A1 Nov. 27, 2008

Related U.S. Application Data

(63) Continuation of application No. 10/474,724, filed as application No. PCT/US02/11593 on Apr. 15, 2002, now abandoned.

(60) Provisional application No. 60/283,356, filed on Apr. 13, 2001.

(51) Int. Cl.
G06F 17/00 (2006.01)
G06Q 10/00 (2006.01)

(52) U.S. Cl. .................................. 705/402; 705/1.1

(58) Field of Classification Search .............. 705/1, 402, 705/1.1
See application file for complete search history.

(56) References Cited

U.S. PATENT DOCUMENTS

| | | | |
|---|---|---|---|
| 3,711,083 A | 1/1973 | Cantrell | |
| 4,122,006 A | 10/1978 | Christensen et al. | |
| 4,514,816 A | 4/1985 | Ollus et al. | |
| 5,001,648 A * | 3/1991 | Baker | 705/407 |
| 5,009,276 A | 4/1991 | Raikes et al. | |
| 5,068,797 A * | 11/1991 | Sansone et al. | 700/219 |
| 5,072,401 A * | 12/1991 | Sansone et al. | 700/219 |
| 5,293,319 A | 3/1994 | Desha et al. | |
| 5,315,094 A | 5/1994 | Lisy | |
| 5,410,675 A | 4/1995 | Shreve et al. | |
| 5,452,654 A | 9/1995 | Connell et al. | |
| 5,557,320 A | 9/1996 | Krebs | |
| 5,627,517 A * | 5/1997 | Theimer et al. | 340/572.1 |
| 5,694,526 A | 12/1997 | Emmett et al. | |
| 5,715,398 A * | 2/1998 | Lubenow et al. | 705/7 |
| 5,729,741 A | 3/1998 | Liaguno et al. | |
| 5,790,633 A | 8/1998 | Kinser, Jr. et al. | |
| 5,897,645 A | 4/1999 | Watters | |
| 5,971,587 A | 10/1999 | Kate et al. | |
| 6,123,796 A | 9/2000 | Kathmann et al. | |
| 6,153,835 A | 11/2000 | Schwartz et al. | |
| 6,188,996 B1 | 2/2001 | Sansome | |
| 6,196,290 B1 | 3/2001 | Tracy et al. | |
| 6,215,859 B1 | 4/2001 | Hanson | |
| 6,259,367 B1 | 7/2001 | Klein | |

(Continued)

OTHER PUBLICATIONS

"US Postal Service expands Global Priority Mail", Nov. 10, 1999, Presswire, pp. 1.*

*Primary Examiner* — Fadey S Jabr

(74) *Attorney, Agent, or Firm* — Finnegan, Henderson, Farabow, Garrett & Dunner, LLP

(57) ABSTRACT

There is provided a method and system of determining efficient routing of a mail piece in a delivery system for delivering mail pieces. The system determines whether or not the mail piece requires urgent delivery. The system determines a weight of the mail piece. Also, the system determines, based on the urgency determination and the weight determination, a most cost-effective place in which to introduce the mail piece into the delivery system.

17 Claims, 6 Drawing Sheets

U.S. PATENT DOCUMENTS

| | | |
|---|---|---|
| 6,268,032 B1 | 7/2001 | Mertens et al. |
| 6,310,957 B1 | 10/2001 | Heller et al. |
| 6,311,054 B1 | 10/2001 | Korpella |
| 6,321,814 B1 | 11/2001 | Tracy et al. |
| 6,363,076 B1 | 3/2002 | Allison et al. |
| 6,385,504 B1 * | 5/2002 | Pintsov et al. ................ 700/226 |
| 6,554,188 B1 * | 4/2003 | Johnson et al. ................ 235/385 |
| 6,762,384 B1 * | 7/2004 | Kechel ........................... 209/584 |
| 7,062,473 B1 * | 6/2006 | Taylor ............................ 705/402 |
| 2002/0133472 A1 * | 9/2002 | Stepno ........................... 705/407 |
| 2002/0147654 A1 * | 10/2002 | Kraisser et al. ................. 705/26 |
| 2003/0182201 A1 * | 9/2003 | Lee ................................. 705/26 |

\* cited by examiner

400

| DEST LVL | DEST ZIP | PIECE ID | ACT WGT | S(a)LB WGT | ZONE | RATE CODE | DC | BC | POSTAGE | CUM $$$ |
|---|---|---|---|---|---|---|---|---|---|---|
| PALLET | BMC 102 | 10000001 | 1.0000 | | 2 | DB | | * | 2.2000 | 2.2 |
| | | 10000002 | 2.0000 | | 2 | DB | | | 2.2300 | 4.43 |
| | | 10000003 | 3.0000 | | 2 | DB | | * | 2.3700 | 6.8 |
| | | 10000004 | 4.0000 | | 2 | DB | | * | 2.5500 | 9.35 |
| | | 10000005 | 5.0000 | | 2 | DB | | * | 2.7100 | 12.06 |
| | | 10000006 | 0.5000 | 0.5000 | | A | | | 0.4975 | 12.5575 |
| | | 10000007 | 0.3750 | 0.3750 | | A | | | 0.4141 | 12.9716 |
| | | 10000008 | 0.5000 | 0.5000 | | A | | | 0.4975 | 13.4691 |
| | | 10000009 | 0.7500 | 0.7500 | | A | | | 0.6643 | 14.1334 |
| | | 10000010 | 0.3750 | 0.3750 | | A | | | 0.4141 | 14.5475 |
| | | 10000011 | 1.2500 | | 2 | BB | | * | 0.7538 | 15.3013 |
| | | 10000012 | 1.2500 | | 2 | BB | | * | 0.7538 | 16.0550 |
| | | 10000013 | 2.2500 | | 2 | BB | | * | 0.8048 | 16.8598 |
| | | 10000014 | 3.2500 | | 2 | BB | | * | 0.8558 | 17.7155 |
| | | 10000015 | 3.2500 | | 2 | BB | | * | 0.8558 | 18.5713 |
| | | 10000016 | 3.0000 | | | BS | | * | 1.8200 | 20.3913 |
| | | 10000017 | 4.0000 | | | BS | | * | 2.2700 | 22.6613 |
| | | 10000018 | 3.0000 | | | BS | | * | 1.8200 | 24.4813 |
| | | 10000019 | 1.0000 | | | BS | | * | 0.9200 | 25.4013 |
| | | 10000020 | 2.0000 | | | BS | | * | 1.3700 | 26.7713 |
| BMC 102 SUB TOTALS | | | | | | | | | | |
| PALLETS=1 | DBMC | Pieces | | | | | | | | |
| sub total | PARCEL SELECT | 5 | 15.0000 | | | | | | 12.0600 | |
| sub total | STD (A) | 5 | 2.5000 | | | | | | 2.4875 | |
| sub total | BPM | 5 | 11.2500 | | | | | | 4.0238 | |
| sub total | SPEC STD B | 5 | 13.0000 | | | | | | 8.2000 | |
| bmc total | | 20 | 41.7500 | 2.5000 | | | | | 26.7713 | |
| | | | | | | | | | | |
| SACK#1 | 10001 | 10000021 | 2.0000 | | L | DD | | | 1.2100 | 1.2100 |
| | | 10000022 | 3.0000 | | L | DD | | * | 1.2600 | 2.4700 |
| | | 10000023 | 0.2400 | 0.2400 | | A | | | 0.2385 | 2.7085 |
| | | 10000024 | 0.1900 | | | A | | | 0.2830 | 2.9915 |
| | | 10000025 | 1.2500 | | L | BB | | * | 0.5750 | 3.5665 |
| | | 10000026 | 1.2500 | | L | BB | | * | 0.5750 | 4.1415 |
| SACK#2 | 10001 | 10000027 | 3.0000 | | | BS | | * | 1.8500 | 5.9915 |
| | | 10000028 | 4.0000 | | | BS | | * | 2.3000 | 8.2915 |
| DDU 10001 SUB TOTALS | | | | | | | | | | |
| | | | | | | | | | | |
| Sacks = 2 | DDU | Pieces | | | | | | | | |
| sub total | PARCEL SELECT | 2 | 5.0000 | | | | | | 2.4700 | |
| sub total | STD (A) | 2 | 0.4300 | | | | | | 0.5215 | |
| sub total | BPM | 2 | 2.5000 | | | | | | 1.1500 | |
| sub total | SPEC STD B | 2 | 7.0000 | | | | | | 4.1500 | |
| DDU totals | | 8 | 14.93 | 0.2400 | | | | | 8.2915 | |
| | | | | | | | | | | |
| Postage total for DBMC and DDU from lines J30 and J48 | | | | | | | | | 35.0627 | |
| Weight total for DBMC and DDU from lines D28 and D45 | | | | 56.6800 | | | | | | |

Figure 4

|   | A | B | C | D | E | F | G | H | I | J | K |
|---|---|---|---|---|---|---|---|---|---|---|---|
| 1 | DEST LVL | DEST ZIP | PIECE ID | ACT WGT | S(a)LB WGT | ZONE | RATE CODE | DC | BC | POSTAGE | CUM $$$ |
| 2 | PALLET | BMC 102 | 10000001 | 1.0000 |  | 2 | DB |  | * | 2.2000 | 2.2 |
| 3 |  |  | 10000002 | 2.0000 |  | 2 | DB |  |  | 2.2300 | 4.43 |
| 4 |  |  | 10000003 | 3.0000 |  | 2 | DB |  | * | 2.3700 | 6.8 |
| 5 |  |  | 10000004 | 4.0000 |  | 2 | DB |  | * | 2.5500 | 9.35 |
| 6 |  |  | 10000005 | 5.0000 |  | 2 | DB |  | * | 2.7100 | 12.06 |
| 7 |  |  | 10000006 | 0.5000 | 0.5000 |  | A |  |  | 0.4975 | 12.5575 |
| 8 |  |  | 10000007 | 0.3750 | 0.3750 |  | A |  |  | 0.4141 | 12.9716 |
| 9 |  |  | 10000008 | 0.5000 | 0.5000 |  | A |  |  | 0.4975 | 13.4691 |
| 10 |  |  | 10000009 | 0.7500 | 0.7500 |  | A |  |  | 0.6643 | 14.1334 |
| 11 |  |  | 10000010 | 0.3750 | 0.3750 |  | A |  |  | 0.4141 | 14.5475 |
| 12 |  |  | 10000011 | 1.2500 |  | 2 | BB |  | * | 0.7538 | 15.3013 |
| 13 |  |  | 10000012 | 1.2500 |  | 2 | BB |  | * | 0.7538 | 16.0550 |
| 14 |  |  | 10000013 | 2.2500 |  | 2 | BB |  | * | 0.8048 | 16.8598 |
| 15 |  |  | 10000014 | 3.2500 |  | 2 | BB |  | * | 0.8558 | 17.7155 |
| 16 |  |  | 10000015 | 3.2500 |  | 2 | BB |  | * | 0.8558 | 18.5713 |
| 17 |  |  | 10000016 | 3.0000 |  |  | BS |  | * | 1.8200 | 20.3913 |
| 18 |  |  | 10000017 | 4.0000 |  |  | BS |  | * | 2.2700 | 22.6613 |
| 19 |  |  | 10000018 | 3.0000 |  |  | BS |  | * | 1.8200 | 24.4813 |
| 20 |  |  | 10000019 | 1.0000 |  |  | BS |  | * | 0.9200 | 25.4013 |
| 21 |  |  | 10000020 | 2.0000 |  |  | BS |  | * | 1.3700 | 26.7713 |
| 22 | SACK#1 | 10001 | 10000021 | 2.0000 |  | 2 | DB |  |  | 2.2300 | 29.0013 |
| 23 |  |  | 10000022 | 3.0000 |  | 2 | DB |  | * | 2.3700 | 31.3713 |
| 24 |  |  | 10000023 | 0.2400 | 0.2400 |  | A |  |  | 0.3241 | 31.6953 |
| 25 |  |  | 10000024 | 0.1900 |  |  | A |  |  | 0.3040 | 31.9993 |
| 26 |  |  | 10000025 | 1.2500 |  | 2 | BB |  | * | 0.7538 | 32.7531 |
| 27 |  |  | 10000026 | 1.2500 |  | 2 | BB |  | * | 0.7538 | 33.5068 |
| 28 | SACK#2 | 10001 | 10000027 | 3.0000 |  |  | BS |  | * | 1.8200 | 35.3268 |
| 29 |  |  | 10000028 | 4.0000 |  |  | BS |  | * | 2.2700 | 37.5968 |
| 30 |  |  |  |  |  |  |  |  |  |  |  |
| 31 | BMC 102 SUB TOTALS |  |  |  |  |  |  |  |  |  |  |
| 32 | PALLETS=1 | SACKS =2 | Pieces |  |  |  |  |  |  |  |  |
| 33 | sub total | PARCEL SELECT | 7 | 20.0000 |  |  |  |  |  | 16.6600 |  |
| 34 | sub total | Standard | 7 | 3.3750 |  |  |  |  |  | 3.1156 |  |
| 35 | sub total | BPM | 7 | 13.7500 |  |  |  |  |  | 5.5313 |  |
| 36 | sub total | SPEC STD B | 7 | 20.0000 |  |  |  |  |  | 12.2900 |  |
| 37 | bmc total |  | 28 | 56.6800 | 3.3750 |  |  |  |  | 37.5968 |  |
| 38 |  |  |  |  |  |  |  |  |  |  |  |
| 39 | Postage total for DBMC from line J37 |  |  |  |  |  |  |  |  | 37.5968 |  |
| 40 | Weight total for DBMC from line D37 |  |  |  |  |  | 56.6800 |  |  |  |  |
| 41 |  |  |  |  |  |  |  |  |  |  |  |
| 42 | Comments about line items |  |  |  |  |  |  |  |  |  |  |
| 43 |  |  |  |  |  |  |  |  |  |  |  |
| 44 | C3 | This pc doesn't get BC discount as indicated by lack of asterisk |  |  |  |  |  |  |  |  |  |
| 45 | C7-C11 | all Standard pieces are rectangular, 6 oz. Or heavier, and are thus eligible for DBMC sorting |  |  |  |  |  |  |  |  |  |
| 46 | C17-C21 | At least 4 pcs to DBMC permits BMC rates and allows $.03 barcode discount |  |  |  |  |  |  |  |  |  |
| 47 | C24, C25 | These two Standard pieces are < 6 oz but are in a 5-digit sack avoiding USPS processing |  |  |  |  |  |  |  |  |  |
| 48 | C26, C27 | These two BPM pieces were rerated from local rate after decision not to go to DDU |  |  |  |  |  |  |  |  |  |
| 49 |  |  |  |  |  |  |  |  |  |  |  |
| 50 |  |  |  |  |  |  |  |  |  |  |  |
| 51 | This illustration presumes that all minimum standards applicable to every class or subclass of mail |  |  |  |  |  |  |  |  |  |  |
| 52 | must be met through background software logic. See related attachments for more specifics |  |  |  |  |  |  |  |  |  |  |

Figure 5

| | A | B | C | D | E | F | G | H | I | J | K |
|---|---|---|---|---|---|---|---|---|---|---|---|
| 1 | DEST LVL | DEST ZIP | PIECE ID | ACT WGT | S(a)LB WGT | ZONE | RATE CODE | DC | BC | POSTAGE | CUM $$$ |
| 2 | PALLET | BMC 102 | 10000001 | 1.0000 | | 2 | DB | | * | 2.2000 | 2.2 |
| 3 | | | 10000002 | 2.0000 | | 2 | DB | | | 2.2300 | 4.43 |
| 4 | | | 10000003 | 3.0000 | | 2 | DB | | * | 2.3700 | 6.8 |
| 5 | | | 10000004 | 4.0000 | | 2 | DB | | * | 2.5500 | 9.35 |
| 6 | | | 10000005 | 5.0000 | | 2 | DB | | * | 2.7100 | 12.06 |
| 7 | | | 10000006 | 0.5000 | 0.5000 | | A | | | 0.4975 | 12.5575 |
| 8 | | | 10000007 | 0.3750 | 0.3750 | | A | | | 0.4141 | 12.9716 |
| 9 | | | 10000008 | 0.5000 | 0.5000 | | A | | | 0.4975 | 13.4691 |
| 10 | | | 10000009 | 0.7500 | 0.7500 | | A | | | 0.6643 | 14.1334 |
| 11 | | | 10000010 | 0.3750 | 0.3750 | | A | | | 0.4141 | 14.5475 |
| 12 | | | 10000011 | 1.2500 | | 2 | BB | | * | 0.7538 | 15.3013 |
| 13 | | | 10000012 | 1.2500 | | 2 | BB | | * | 0.7538 | 16.0550 |
| 14 | | | 10000013 | 2.2500 | | 2 | BB | | * | 0.8048 | 16.8598 |
| 15 | | | 10000014 | 3.2500 | | 2 | BB | | * | 0.8558 | 17.7155 |
| 16 | | | 10000015 | 3.2500 | | 2 | BB | | * | 0.8558 | 18.5713 |
| 17 | | | 10000016 | 3.0000 | | | BS | | * | 1.8200 | 20.3913 |
| 18 | | | 10000017 | 4.0000 | | | BS | | * | 2.2700 | 22.6613 |
| 19 | | | 10000018 | 3.0000 | | | BS | | * | 1.8200 | 24.4813 |
| 20 | | | 10000019 | 1.0000 | | | BS | | * | 0.9200 | 25.4013 |
| 21 | | | 10000020 | 2.0000 | | | BS | | * | 1.3700 | 26.7713 |
| 22 | BMC 102 SUB TOTALS | | | | | | | | | | |
| 23 | PALLETS=1 | DBMC | Pieces | | | | | | | | |
| 24 | sub total | PARCEL SELECT | 5 | 15.0000 | | | | | | 12.0600 | |
| 25 | sub total | Standard | 5 | 2.5000 | | | | | | 2.4875 | |
| 26 | sub total | BPM | 5 | 11.2500 | | | | | | 4.0238 | |
| 27 | sub total | SPEC STD B | 5 | 13.0000 | | | | | | 8.2000 | |
| 28 | bmc total | | 20 | 41.7500 | 2.5000 | | | | | 26.7713 | |
| 29 | | | | | | | | | | | |
| 30 | SACK#1 | 10001 | 10000021 | 2.0000 | | L | DD | | | 1.2100 | 1.2100 |
| 31 | | | 10000022 | 3.0000 | | L | DD | | * | 1.2600 | 2.4700 |
| 32 | | | 10000023 | 0.2400 | 0.2400 | | A | | | 0.2385 | 2.7085 |
| 33 | | | 10000024 | 0.1900 | | | A | | | 0.2830 | 2.9915 |
| 34 | | | 10000025 | 1.2500 | | L | BB | | * | 0.5750 | 3.5665 |
| 35 | | | 10000026 | 1.2500 | | L | BB | | * | 0.5750 | 4.1415 |
| 36 | SACK#2 | 10001 | 10000027 | 3.0000 | | | BS | | * | 1.8500 | 5.9915 |
| 37 | | | 10000028 | 4.0000 | | | BS | | * | 2.3000 | 8.2915 |
| 38 | DDU 10001 SUB TOTALS | | | | | | | | | | |
| 39 | | | | | | | | | | | |
| 40 | Sacks = 2 | DDU | Pieces | | | | | | | | |
| 41 | sub total | PARCEL SELECT | 2 | 5.0000 | | | | | | 2.4700 | |
| 42 | sub total | Standard | 2 | 0.4300 | | | | | | 0.5215 | |
| 43 | sub total | BPM | 2 | 2.5000 | | | | | | 1.1500 | |
| 44 | sub total | SPEC STD B | 2 | 7.0000 | | | | | | 4.1500 | |
| 45 | DDU totals | | 8 | 14.93 | 0.2400 | | | | | 8.2915 | |
| 46 | | | | | | | | | | | |
| 47 | Postage total for DBMC and DDU from lines J28 and J45 | | | | | | | | | 35.0627 | |
| 48 | Weight total for DBMC and DDU from lines D28 and D45 | | | | | 56.6800 | | | | | |
| 49 | Comments about line items | | | | | | | | | | |
| 50 | C3 | This pc doesn't get BC discount as indicated by lack of asterisk | | | | | | | | | |
| 51 | C17-C21 | At least 4 pcs to DBMC permits BMC rates and allows $.03 barcode discount | | | | | | | | | |
| 52 | C32, C33 | These two Standard pieces are < 6 oz but are in a 5-digit sack avoiding USPS processing | | | | | | | | | |
| 53 | | | | | | | | | | | |
| 54 | This illustration presumes that all minimum standards applicable to every class or subclass of mail | | | | | | | | | | |
| 55 | must be met through background software logic. See related attachments for more specifics. | | | | | | | | | | |

Figure 6

MANIFEST DELIVERY SYSTEM AND METHOD

This is a continuation of application Ser. No. 10/474,724, filed Oct. 14, 2003 now abandoned, which was the National Stage of PCT Application No. PCT/US02/11593, filed Apr. 15, 2002, and claims the benefit of U.S. Provisional Application No. 60/283,356, filed Apr. 13, 2001, wherein the PCT and provisional applications are incorporated herein by reference.

FIELD

The present invention relates to delivery of mail pieces, and more specifically, to methods and systems for determining where to most cost-effectively introduce a mail piece in a delivery system.

BACKGROUND

Today's systems for handling and delivering mail pieces, such as, for example, packages, letters, flats, catalogues, and postcards are highly complex. For instance, mail pieces may be input into a delivery system at any number of locations. The mail pieces may be input at a delivery office, such as a post office close to the mailer, or a delivery office close to the receiver of the mail piece. Similarly, the mail pieces may be addressed to a plurality of receivers, including receivers both near and far from the mailer. Oftentimes, mail pieces introduced into a delivery system are delivered via inefficient routes and services which thereby may incur additional costs.

One type of delivery service for mail pieces in a delivery system is bulk mailing. Bulk delivery involves consolidating a group of mail pieces together so that they may be input into a delivery system together. For those entities involved in bulk delivery, inefficiencies in delivery systems can compound into exorbitant and unnecessary charges for the mailer. For example, mail consolidators provide a type of bulk delivery. Mail consolidators are entities which take mail pieces from a plurality of sources and combine the mail pieces to obtain the best delivery rates of the delivery system, such as bulk delivery discount rates. With such a great number of mail pieces, mail consolidators must find the most cost-efficient ways of utilizing a delivery system. For example, when mail consolidators use a delivery system, such as the United States Postal Service (USPS), the mail consolidators must choose where in the delivery stream of the delivery system to introduce a consolidated group of mail pieces, wherein such placement in the delivery stream will determine the rates that will be charged.

Manifest delivery is a mail piece processing method and system which may be utilized with bulk delivery. Manifest delivery allows a mailer to document delivery costs and fees for all mail pieces in a mailing, such as a bulk delivery, via imprinted indicia, such as, for example, with a bar code. Each mail piece in the mailing is assigned a unique identification number that may be compared with a manifest which contains the unique identification number. The unique identification number is then coded into an indicia and imprinted on the corresponding mail piece. The imprinted indicia may also contain other information, such as, for example, delivery fee due. Thus, using the imprinted indicia eliminates the need to affix postage. Manifests and indicia may be used to track domestic or international deliveries, as well as fees for special services. Mailers may present manifest documentation to the delivery system office in hard copy or in an electronic format, such as, for example, on a diskette or via an e-mail.

Within the USPS, a mailer may introduce mail pieces at a number of different places in a delivery stream of the delivery system to obtain the benefit of a number of different rate classifications for the delivery. A delivery stream comprises the entire route a mail piece travels from the mailer to its destination. FIG. 1 illustrates a conventional delivery system 100 and the flow of mail pieces in this system. For example, a consolidator or other mailer 110 may introduce a group of mail pieces at a number of different delivery system offices. Mailer 110 may introduce the group of mail pieces at a destination bulk delivery center (DBMC) 120, which represents the least finely sorted mail and the smallest postage savings compared to normal first class mailing. A manifest accompanying this group of mail pieces to DBMC 120 would include information about all the mail pieces in the group. Other options for introducing the group of mail pieces include destination sectional center facilities (DSCF) 130, wherein mail is sorted to an intermediate level farther in the delivery stream, providing an intermediate level of postage savings. The farthest location downstream in which the group of mail pieces can be introduced are destination delivery units (DDU) 140 which would be closest to the destination and where a mailer 110 would realize the greatest postage savings.

A mailer's use of DBMC 120, DSCF 130, and DDU 140 are governed by a multitude of rules. These rules govern, for example, required minimum numbers of mail pieces and the method of presenting the mail pieces, such as palletization of mail pieces. Often, mailers and/or consolidators are unaware of how and when to make critical decisions which will lead to the most cost effective mailing of their mail pieces.

Thus, there is a need to overcome these and other problems and provide a method and system for determining where to most cost-efficiently introduce a mail piece in a delivery system.

SUMMARY

In accordance with certain aspects consistent with the present invention, there is provided a method of determining efficient routing of a mail piece in a delivery system for delivering mail pieces comprising determining whether or not the mail piece requires urgent delivery, determining a weight of the mail piece, and determining, based on the urgency determination and the weight determination, a most cost-effective place in which to introduce the mail piece into the delivery system.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects consistent with the present invention and together with the description, serve to explain the principles of the invention.

FIG. 4 is an illustration of an exemplary mail piece manifest according to an exemplary embodiment of the present invention;

FIG. 5 is another illustration of an exemplary mail piece manifest according to an exemplary embodiment of the present invention; and FIG. 6 is yet another illustration of an exemplary mail piece manifest according to an exemplary embodiment of the present invention.

DETAILED DESCRIPTION

In the following description, reference is made to the accompanying drawings that form in part thereof, and in which is shown by way of illustration, specific exemplary embodiments in which the invention may be practiced. These embodiments are sufficient in detail to enable those skilled in the art to practice the invention and it is to be understood that the embodiments may be utilized and that changes may be made without departing from the scope of the invention. The following description is, therefore, not to be taken in a limited sense.

One embodiment consistent with the present invention recognizes the growing business of logistics management, whereby the connection between two business entities, a mailer and a mail piece consolidator, are closely managed by a process that ensures that the least costs are incurred by both entities. This approach attempts to provide a method to minimize costs among many different mailers and mail piece consolidators when they deal with large volumes of individualized mail pieces.

Figure 1:
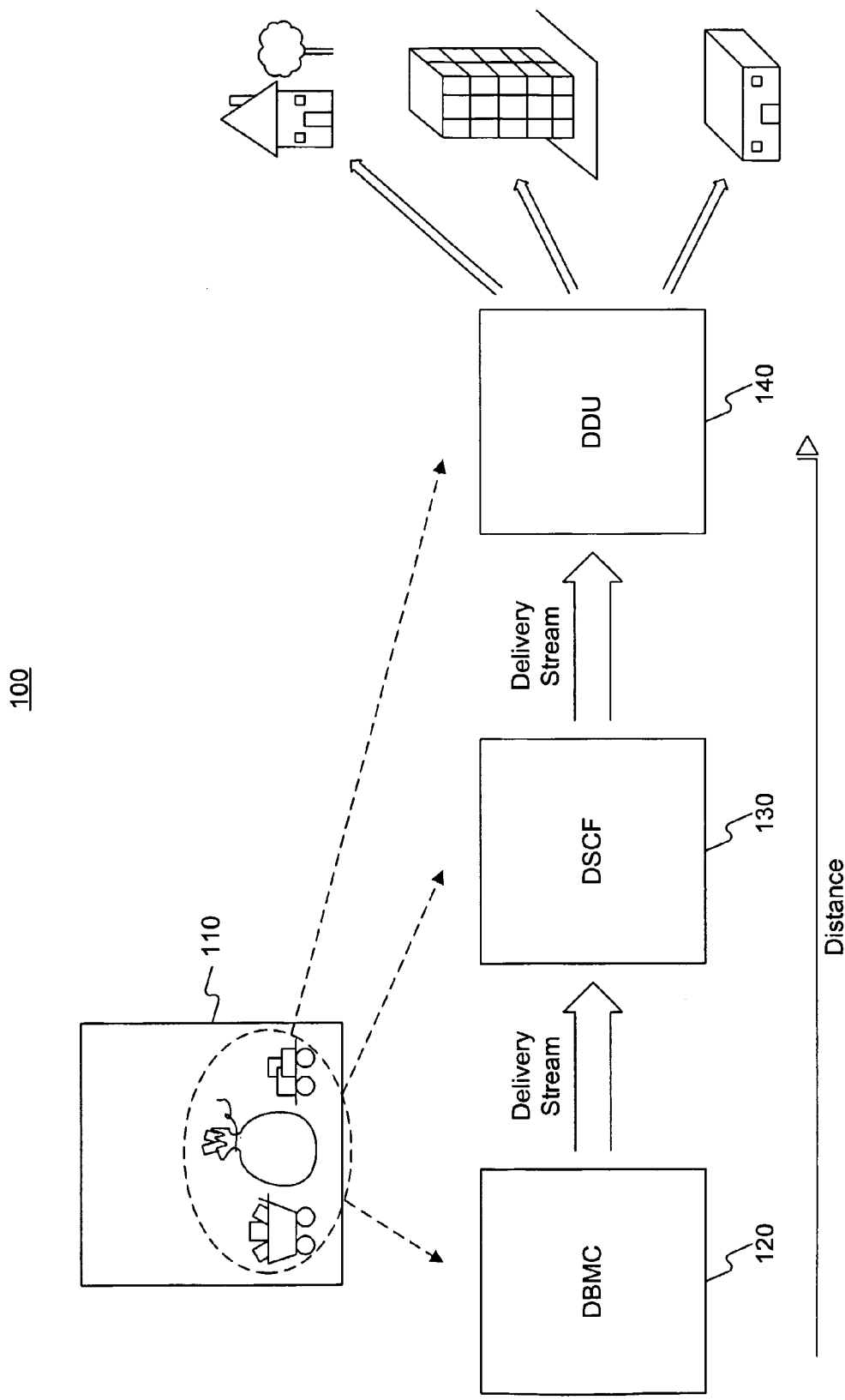
FIG. 1 is a diagram of a conventional delivery system and flow of mail in the delivery system.
Figure 2:
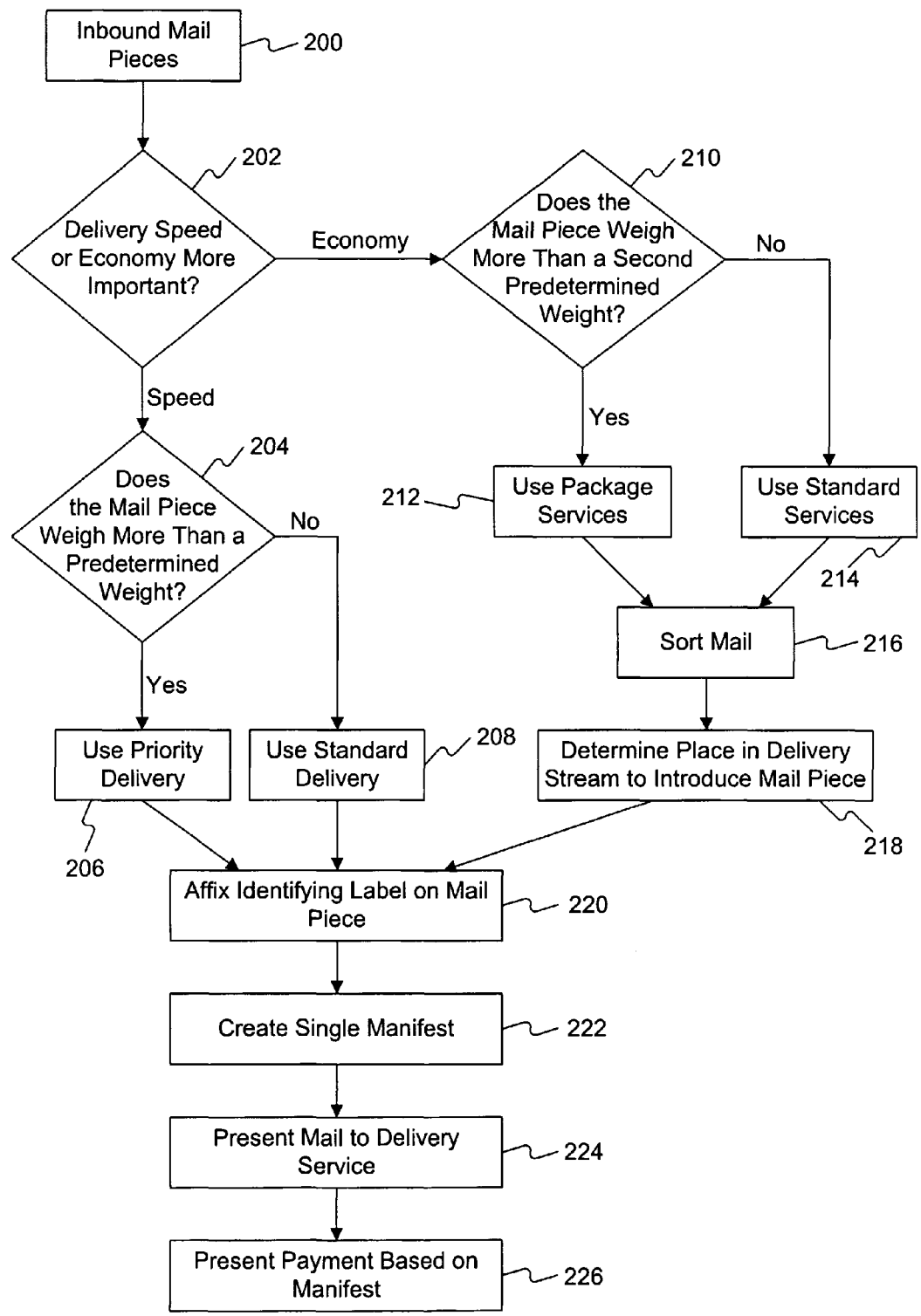
FIG. 2 is a flowchart of a mail piece processing method according to an exemplary embodiment of the present invention.

FIG. 2 is a flowchart of a mail piece processing method according to one exemplary embodiment of the present invention. The process begins at stage 200 with a mail consolidator receiving a plurality of inbound mail pieces. At stage 202, a determination is made whether delivery speed or economy is more important for delivering inbound mail pieces. For example, if a mail piece is a time sensitive bill or a check, speed may be more critical than economy. But, if the mail piece is non-time sensitive mail, such as, for example, a letter or catalog, economy may be more critical.

When speed is more important, another determination is made at stage 204. Stage 204 comprises determining the weight of the mail piece. The weight of the mail piece is compared to a predetermined weight which relates to the type of service available. The predetermined weight will determine if a priority or regular service may be available for the mail piece. If the mail piece weighs more than the predetermined weight, the mail piece is flagged for priority service (stage 206). If the mail piece weighs less than the predetermined weight, the mail piece is flagged for standard service (stage 208).

For example, if the delivery service is the USPS and the mail piece weighs more than 13 ounces, priority mail is used. When the mail piece weighs less than 13 ounces, first-class mail is used.

When economy is determined to be the more important delivery criterion in stage 202, another determination is made in stage 210. At stage 210, it is determined whether the mail piece weighs more than a second predetermined weight. As in the case where delivery speed is more important, the second predetermined weight relates to the type of service available. The second predetermined weight determines if a package service or standard service may be available for the mail piece. If the mail piece weighs more than the second predetermined weight, the mail piece is flagged for package services (stage 212). If the mail piece weighs less than the second predetermined weight, the mail piece is flagged for standard service (stage 214).

For example, if the USPS is the delivery system and the mail piece weighs more than 16 ounces, package services is used, in stage 212. When the mail piece does not weigh more than 16 ounces in this exemplary case, standard services is used in stage 214.

After it is determined what service should be used, mail pieces are sorted (stage 216). For example, inbound mail pieces may be sorted into different groupings, such as sacks of mail pieces, trays of mail pieces, or pallets of mail pieces. Moreover, sorting mail stage 216 may comprise sorting the mail pieces based on their zip code or other destination indicator, or based on size to preclude safety issues arising regarding weight or cubic volume.

Next, in stage 218, it is determined where in the delivery stream of the delivery system to introduce inbound mail pieces. This determination is based, in part, on the results of sorting stage 216. Again, those mail pieces introduced farther in the delivery stream will generally receive the greatest savings in delivery charges, since less mail piece processing is required by the delivery service. Those mail pieces introduced earlier in the delivery stream will receive less postage savings due to greater mail piece processing. The determination made at stage 218 may also be affected by a total number of mail pieces. For example, savings may be attained by consolidating more than one mail piece in a single mass delivery.

Regardless of whether speed or economy is most important, an identifying indicia is affixed on all mail pieces at stage 220. One skilled in the art would realize methods of affixing indicia may include, for example, manual placement, automatic pressure placement, and blow-on placement. The identifying indicia may comprise, for example, information relating to mail piece sorting stage 216, determining stage 218, or, more simply, which delivery service is being used.

Based on the identifying indicia, a single manifest is created (stage 222). This single manifest may comprise all data relating to the shipment of inbound mail pieces, such as delivery service, location of mail input, and delivery charges.

Once the manifest is created as shown in stage 222, inbound mail pieces are presented to the delivery service, which will be carrying the mail pieces (stage 224). In stage 226, based on the single manifest, payments are presented to the delivery service.

Optionally, the determining stage 218 may be tempered by classification eligibility. Based on, for example, content sensitivity, processing category, or sorting capability, a mail piece may not be eligible for certain mailing services. Mail pieces which are content sensitive include, for example, First-Class mail under delivery monopoly, such as personal correspondence, bills, or statements of account. Processing categories apply to materials that have an odd shape, such as, for example, an irregular parcel, a roll or a tube, a root or a plant scion, or a mail piece not otherwise capable of mechanical processing (as opposed to a letter, flat, or machinable parcel). Mail pieces in processing categories often require more complicated management compared to mail pieces that can be mechanically processed. Similarly, sorting capability involves the ability of a mail piece to be mixed with other items for sorting. For example, due to likely damage to itself, other parcels, or mechanical equipment, mail pieces comprising dense matter (such as, for example, a bowling ball or a shot put) or extremely fragile material, may not be sortable.

Figure 3:
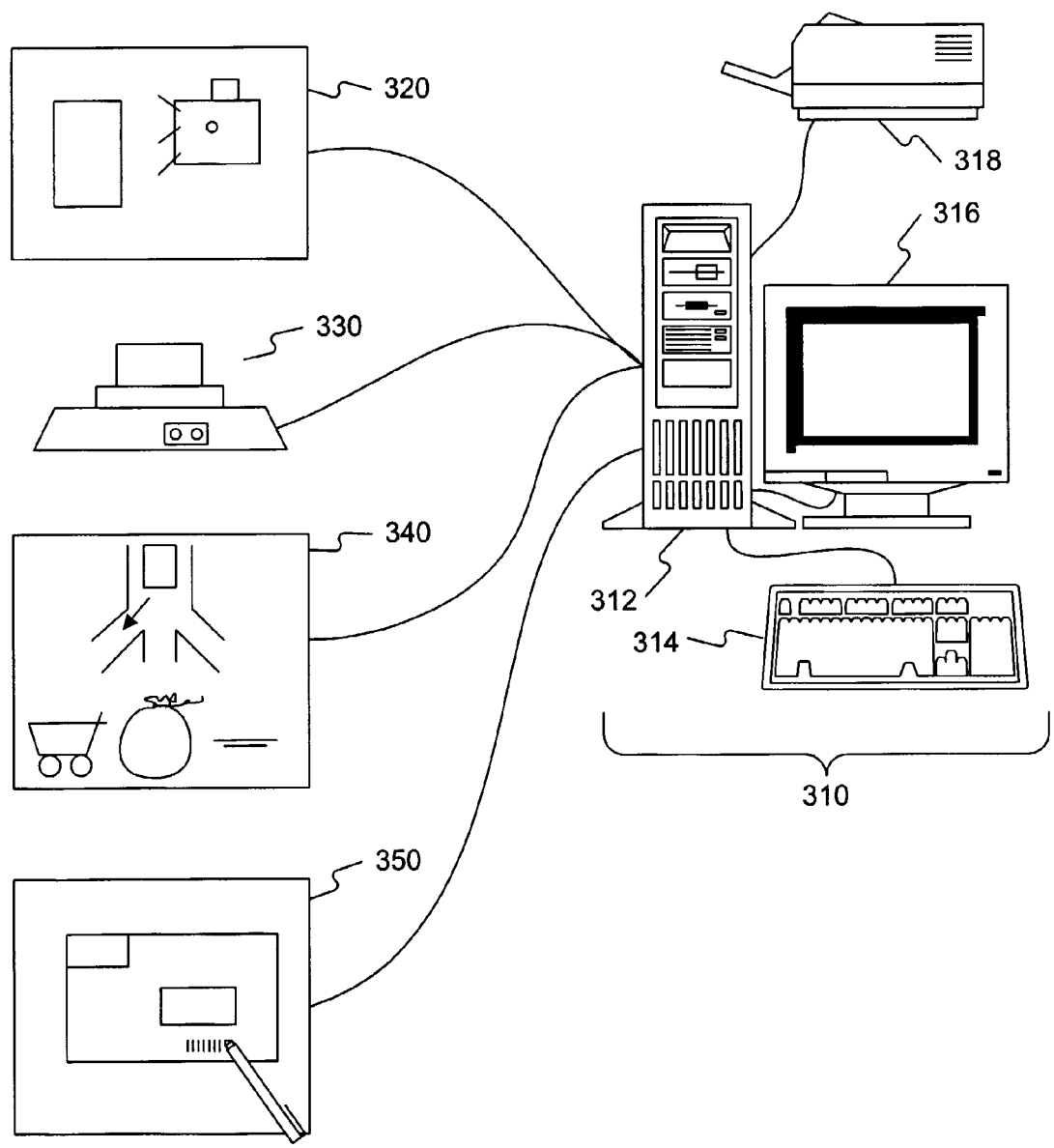
FIG. 3 is a diagram of a mail piece processing system according to an exemplary embodiment of the present invention.

FIG. 3 is a diagram of a mail piece processing system 300 for performing the mail piece processing method illustrated above in FIG. 2. System 300 comprises a system control unit 310, an imaging unit 320, a scale 330, a mail piece sorter 340, and an identification indicia affixing unit 350.

System control unit 310 serves to control different components of mail processing system 300. System control unit 310 also performs the various determinations of the mail processing method and creates the manifest for the mail pieces.

System control unit 310 comprises a computer unit 312, an input device 314, a monitor 316, and a printer 318. Computer unit 312 may contain standard components for inputting, outputting, manipulating, and storing data. For example, the computer unit may comprise a central processing unit (CPU), random access memory (RAM), video card, sound card, magnetic storage devices, optical storage devices, input/output (I/O) terminals, and a network interface card (NIC) (all not shown). Computer unit 312 may be connected to printer 318 through the I/O terminals. Examples of the I/O terminals to which printer 318 may be connected are parallel, serial, universal serial bus, and IEEE 1394. Likewise, input device 314 may be connected to computer unit 312 though the I/O terminals. Also, monitor 316 may be connected to computer unit 312 through the video card.

Computer unit 312 may also be connected to other computer units and control systems through a network (not shown) via the NIC. For example, the network may be a local area network (LAN) or wide area network (WAN), such as the Internet, or wireless network.

Computer unit 312 is configured to receive information describing the mail pieces, such as type and weight, determine a delivery system stream entry point, and generate a mail piece manifest. The processes may be configured in the form of a process created using various programming languages or software suites. For example, delivery system stream entry point determination and manifest generation processes may be a program written in the Java™ programming language, hypertext markup language, spreadsheet platform, or C programming language.

Imaging unit 320, for example, a digital scanner or digital optical character recognition (OCR) camera, is connected to computer unit 312 through one of the I/O terminals. Imaging unit 320 is used to scan the inbound mail and capture an image of the mail piece. The image of the mail piece may be transferred from scanning unit 320 to computer unit 312 via the I/O terminals. Computer unit 312 can determine the type of mail piece by comparing the image with sample images stored on computer unit 312. Once the type of the mail piece is determined, the decision to prioritize the speed or economy, in stage 202, can be made. For example, the mailer of the mail piece is determined, such as an utility company, and then a determination of the type of processing is made for that particular mailer.

Alternately, imaging unit 320 may be removed and a human operator may view each mail piece and determine if speed or economy processing is necessary.

Scale 330 is connected to computer unit 312 through the I/O terminals. The mail pieces are placed on scale 330 in order to determine the weight of the mail piece (stage 204, 210). Once the weight is determined, the weight is transferred from weight unit 330 to computer unit 312 via the I/O terminals.

Alternately, a human operator may observe the weight of each mail piece on scale 330 and input the weight of each mail piece in computer unit 312 via input device 314.

Sorting unit 340 is an automatic sorting machine. Sorting unit 340 may be connected to computer unit 312 through the I/O terminals. Sorting unit 430 sorts into different bins, such as bags or carts, based on information transferred from computer unit 312. Alternately, sorting unit 340 may be a human operator manually sorting mail pieces into different bins.

Once all the information on the mail pieces has been entered into computer unit 312, the delivery system stream for the mail pieces is determined. The determination is achieved by determining the delivery charges for the mail pieces for various delivery system streams. For example, a database containing the delivery rates for mail pieces based on weight and delivery system stream entry point may be stored on a storage device in computer unit 312. For each mail piece, computer unit 312 determines the delivery charge of each mail piece or a group of mail pieces for different delivery system stream entry points. Then, the best delivery system stream entry point is determined by comparing the different delivery charges for the different entry points.

Identification indicia affixing unit 350 is connected to computer unit 312 through the I/O terminals. For example; identification indicia affixing unit 350 may affix a indicia by manual placement, automatic pressure placement, or blow-on placement. Once the mail pieces are sorted and the delivery system stream entry point is determined, a mail piece is fed to identification indicia affixing unit 350 whereby a identification indicia is affixed to each mail piece. The identification indicia uniquely identifies a mail piece and may include other information, such as delivery charge.

Once the mail pieces are affixed with information indicia, computer unit 312 generates the manifest. The manifest may be in hard copy output from printer 318 or in an electronic format, such as on a diskette or via an e-mail. The manifest may contain such information as, for example, delivery charge, delivery method, mail piece type, etc.

In FIG. 3, the different units are illustrated as separate units. One skilled in the art would realize that separate units could be combined into one single system. For example, a standard mail sorting machine, such as those utilized by the USPS, may be adapted by adding a imaging unit, scale, and indicia affixing unit to perform the mail piece processing method illustrated in FIG. 2.

FIG. 4 illustrates an exemplary mail piece manifest for use in a delivery system of the USPS. This manifest incorporates all factors relating to a mailer's request for service and any and all standards, regulations, or volume requirements that exist for a given flow of material. Choice of delivery service or classification may be improved by automating these standards, regulations, or volume requirements in an electronic manifest. Savings and benefits versus other choices of services may be garnered. A single manifest may be used for each mail type determined at stage 202 of FIG. 2. Thus, for example, a single manifest may be used for those mail pieces for which economy is most important. Optionally, the manifest may be divided into separate economy and speed manifests.

FIG. 4 illustrates an example of such an economy manifest 400 arranged in columns and rows. Each row entry 402 comprises a complete record for a single mail piece, each piece being identified by a mail piece identifier 404. A destination level column 406 identifies a type of bulk delivery, such as mail pieces on pallets, in trays, or in sacks. A destination zip code column 408 identifies a delivery zip code and, based on pre-sorting, a level of entry into the postal system.

For example, mail pieces which are delivered to a DDU will be represented by a 5-digit zip code in column entry 408, while those mail pieces being delivered to a DBMC will be represented by the first 3 digits of a zip code. Actual weight column 410 represents the actual weight of each mail piece, here shown, for example, in pounds. Standard services weight column 412 represents the weight of each package designated for standard services. Mail pieces under 16 ounces, here classified as, for example, standard service, have a different rate structure based on whether the mail piece weighs more or less than a prespecified weight. For example, mail pieces weighing less than four ounces could be eligible for the same rate of 25 cents. In contrast, the postage for mail pieces exceeding four ounces may be based on actual weight as a portion of a pound. For example, if the standard service delivery rate is one dollar per pound, postage for an eight ounce mail piece would be 50 cents. Moreover, those mail pieces exceeding 16 ounces may be displayed on the manifest in partial pound increments to illustrate actual weight, but such mail pieces may be charged postage at the next highest full-pound weight. Thus, for example, a mail piece weighing 3.05 pounds is payable at the 4-pound rate.

Zone indicator column 414 represents a code for a distance between a mailer office and a receiver office. Table 1 contains exemplary zone indicators are presented below for the USPS mail system:

TABLE 1

| Zone | Definition |
| --- | --- |
| Local "L" | The local zone applies to mail deposited at any post office for delivery to addresses within the delivery area of that office. |
| 1 | Includes non-local destination offices <50 miles away |
| 2 | Includes destination offices >50 miles and <150 miles away |
| 3 | includes destination offices >150 miles and <300 miles away |
| 4 | includes destination offices >300 miles and <600 miles away |
| 5 | includes destination offices >600 miles and <1000 miles away |
| 6 | includes destination offices >1000 miles and <1400 miles away |
| 7 | includes destination offices >1400 miles and <1800 miles away |
| 8 | includes destination offices >1800 miles away |

A delivery rate code column 416 indicates a type of delivery service being used. Table 2 contains exemplary delivery rate codes for the USPS delivery system are presented below:

TABLE 2

| | |
| --- | --- |
| First-Class Mail | 1 |
| Priority Mail | 1P |
| Priority Mail - Flat-rate Envelope | PF |
| Bound Printed Matter | BB |
| Library Mail | BL |
| Parcel Post Local and Intra-BMC/ASF | BI |
| Parcel Post Inter-BMC/ASF Machinable | BR |
| Parcel Post Inter-BMC/ASF Nonmachinable | BN |
| Parcel Post Destination Bulk Mail Center | DB |
| Parcel Post Destination Sectional Center Facility | DS |
| Parcel Post Destination Delivery_Unit | DD |
| Special Standard Mail | BS |
| Standard Service | A |
| Balloon Rate | X |
| Oversized | O |
| Book & Sheet Music | BK |
| Letter/Letter Packages | LC |
| M-Bag-Regular Printed Matter, Catalogs & Directories (Surface) | PMM |
| M-Bag-Books, Sheet Music (Surface) | BKM |
| Air M-Bag | AM |
| Parcel Post | PP |

TABLE 2-continued

| | |
| --- | --- |
| Printed Matter | PM |
| Small Packet | SP |

Definitions and uses for these delivery rate codes can be found, for example, in United States Postal Service Publication 401, "Guide to the Manifest Mailing System."

Delivery confirmation indicator column 418 is a binary indicator representing whether or not a delivery confirmation service is required for a mail piece. Likewise, bar code indicator column 420 is a binary indicator representing whether or not a mail piece would receive a discounted rate by including a bar code. Postage indicator column 422 represents the calculated postage for a given mail piece. Calculation of the postage may be based on one or more indicators 410, 412, 414, 416, 418, and 420. Finally, a cumulative postage column 424 represents a running postage charge for all mail pieces in listed economy manifest 400.

Economy manifest 400 may be used by a delivery system to track packages through the delivery system. Economy manifest 400 may also be used to track total postage charges for a delivery. FIG. 4 facilitates decision making as to where mail pieces should be introduced in the delivery stream. The decision to introduce mail pieces earlier in the delivery stream, with its attendant higher delivery costs, is balanced with the transportation and other costs associated with a choice to deliver the mail pieces farther along in the delivery system stream. An exemplary economy manifest 400 would be automated to include calculation functions and logic to ensure that all requirements for various delivery classifications would be met.

FIGS. 5 and 6 show how these exemplary mail manifests could be used to compare costs between two different sets of decisions on where to introduce mail in a USPS delivery system. For example, FIG. 5 shows a delivery where all mail pieces (e.g., those on a pallet, in sack #1, and in sack #2) are introduced at the DBMC. As indicated in cell J39 of FIG. 5, the postage total for mail pieces sent in this way would be $37.5968. In contrast, FIG. 6 shows a delivery where some mail pieces are introduced at the DBMC (including those on a pallet), while others are introduced at the DDU level (including those in sack #1 and sack #2). With this strategy, the postage, as calculated in cell J47 of FIG. 6, would be $35.0627. A mailer may similarly use these exemplary mail piece manifests to determine a most cost-effective way to introduce mail pieces in a delivery system stream. Moreover, a mailer may run alternative scenarios considering many different entry points for mail pieces in order to obtain an optimum cost for a mailing.

While the manifests illustrated in FIGS. 4-6 show a USPS delivery system, it is to be understood that the principles of the invention may be used also in private express and courier systems, freight transportation, and the like. The manifest would be structured in a similar manner. The difference would be the rates for different delivery services used to calculate delivery costs and codes used to specify the different services.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A non-transitory computer-readable medium tangibly embodied in a storage device encoded with instructions which, when executed on a processor, perform a method of determining efficient routing of a mail piece in a delivery system for delivering mail pieces, the method comprising:
  determining whether the mail piece requires urgent delivery or non-urgent delivery;
  processing the mail piece, if the mail piece requires urgent delivery, according to an urgent delivery processing procedure, the urgent delivery processing procedure comprising:
    determining a first weight of the mail piece;
    comparing the first weight of the mail piece to a first predetermined value;
    selecting priority delivery if the first weight exceeds the first predetermined value; and
    selecting standard delivery if the first weight does not exceed the first predetermined value;
  processing the mail piece, if the mail piece requires non-urgent delivery, according to a non-urgent delivery processing procedure, the non-urgent delivery processing procedure comprising:
    determining a second weight of the mail piece;
    comparing the second weight of the mail piece to a second predetermined value;
    selecting high-weight services if the second weight exceeds the second predetermined value; and
    selecting standard services if the second weight does not exceed the second predetermined value; and
  determining, based on whether the mail piece was processed according to the urgent delivery processing procedure or the non-urgent delivery processing procedure, a desired place in which to introduce the mail piece into the delivery system based on lowest cost.

2. The computer-readable medium of claim 1 wherein determining the desired place in which to introduce the mail piece into the delivery system is further based on a total number of mail pieces to be delivered.

3. The computer-readable medium of claim 2 wherein determining the desired place in which to introduce the mail piece into the delivery system is further based on comparing a cost of introducing a mail piece at a first point into the delivery system versus a cost of introducing the mail piece at a second point into the delivery system.

4. The computer-readable medium of claim 1, wherein the method further comprises generating a manifest including the weight of the mail piece, an identification number of the mail piece, the desired place, and a delivery charge for the mail piece.

5. The computer-readable medium of claim 1, wherein the urgency determination for the mail piece is a delivery maximizing delivery speed.

6. The computer-readable medium of claim 1, wherein the urgency determination for the mail piece is a delivery maximizing delivery cost economy.

7. The computer-readable medium of claim 1, wherein the determining the delivery place in which to introduce the mail piece into the delivery system comprises:
  calculating a cost of introducing the mail piece at each of a plurality of locations in the delivery system; and
  selecting the location with the lowest cost of introducing the mail piece.

8. An apparatus for determining efficient routing of a mail piece in a delivery system for delivering mail pieces comprising:
  a storage device containing computer-executable instructions; and
  a processor coupled to the storage device and operating the instructions to:
    determine whether the delivery of the mail piece is urgent or not urgent;
    process the mail piece, if the delivery of the mail piece is urgent, according to an urgent delivery processing procedure, the urgent delivery processing procedure comprising:
      determining a first weight of the mail piece;
      comparing the first weight of the mail piece to a first predetermined value;
      selecting priority delivery if the first weight exceeds the first predetermined value; and
      selecting standard delivery if the first weight does not exceed the first predetermined value;
    process the mail piece, if the delivery of the mail piece is not urgent, according to a non-urgent delivery processing procedure, the non-urgent delivery processing procedure comprising:
      determining a second weight of the mail piece;
      comparing the second weight of the mail piece to a second predetermined value;
      selecting high-weight services if the second weight exceeds the second predetermined value; and
      selecting standard services if the second weight does not exceed the second predetermined value; and
    determine, based on (1) whether the mail piece was processed according to the urgent delivery procedure or the non-urgent delivery procedure, and (2) at least one other classification criteria, a desired point for introducing the mail piece into the delivery system based on lowest cost.

9. The apparatus of claim 8, wherein the at least one other classification criteria comprises content sensitivity of the mail pieces.

10. The apparatus of claim 8, wherein the at least one other classification criteria comprises a processing category for the mail pieces.

11. The apparatus of claim 8, wherein the at least one other classification criteria comprises whether the mail pieces are pre-sorted.

12. The apparatus of claim 11, wherein the mail pieces are pre-sorted based on at least one of a destination indicator and a size of the mail piece.

13. The apparatus of claim 8, wherein the processer is further configured to generate a manifest including the weight of the mail piece, the at least one other classification criteria, the desired place, and a delivery charge for the mail piece.

14. The apparatus of claim 8, wherein the urgency determination for the mail piece is a delivery maximizing delivery speed.

15. The apparatus of claim 8, wherein the urgency determination for the mail piece is a delivery maximizing delivery cost economy.

16. A system for determining efficient routing of a mail piece in a delivery system for delivering mail pieces comprising:
  a control unit for determining whether the mail piece requires urgent delivery or non-urgent delivery;
  a mail sorting machine comprising a scale for processing the mail piece, wherein:
    if the mail piece requires urgent delivery, processing the mail piece according to an urgent delivery processing procedure, the urgent delivery processing procedure comprising:
      determining a first weight of the mail piece;
      comparing the first weight of the mail piece to a first predetermined value;

selecting priority delivery if the first weight exceeds the first predetermined value; and selecting standard delivery if the first weight does not exceed the first predetermined value; and if the mail piece requires non-urgent delivery, processing the mail piece according to a non-urgent delivery processing procedure, the non-urgent delivery processing procedure comprising:

determining a second weight of the mail piece;

comparing the second weight of the mail piece to a second predetermined value;

selecting high-weight services if the second weight exceeds the second predetermined value; and selecting standard services if the second weight does not exceed the second predetermined value; and a determination component for determining, based on whether the mail piece was processed according to the urgent delivery processing procedure or the non-urgent delivery processing procedure, a desired place in which to introduce the mail piece into the delivery system based on lowest cost.

17. A system for determining efficient routing of a mail piece in a delivery system for delivering mail pieces comprising:

a control unit for determining whether the delivery of the mail piece is urgent or not urgent;

a mail sorting machine comprising a scale for processing the mail piece, wherein:

if the delivery of the mail piece is urgent, processing the mail piece according to an urgent delivery processing procedure, the urgent delivery processing procedure comprising:

determining a first weight of the mail piece;

comparing the first weight of the mail piece to a first predetermined value;

selecting priority delivery if the first weight exceeds the first predetermined value; and selecting standard delivery if the first weight does not exceed the first predetermined value; and if the delivery of the mail piece is not urgent, processing the mail piece according to a non-urgent delivery processing procedure, the non-urgent delivery processing procedure comprising:

determining a second weight of the mail piece;

comparing the second weight of the mail piece to a second predetermined value;

selecting high-weight services if the second weight exceeds the second predetermined value; and selecting standard services if the second weight does not exceed the second predetermined value; and means a determination component for determining, based on (1) whether the mail piece was processed according to the urgent delivery procedure or the non-urgent delivery procedure, and (2) at least one other classification criteria, a desired point for introducing the mail piece into the delivery system based on lowest cost.

\* \* \* \* \*

UNITED STATES PATENT AND TRADEMARK OFFICE
CERTIFICATE OF CORRECTION

PATENT NO. : 7,996,333 B2  Page 1 of 1
APPLICATION NO. : 12/104237
DATED : August 9, 2011
INVENTOR(S) : Peter Furka It is certified that error appears in the above-identified patent and that said Letters Patent is hereby corrected as shown below:

IN THE CLAIMS:

Claim 17, col. 12, line 22, delete "means" before -- a determination --.

Signed and Sealed this
Eighteenth Day of October, 2011

David J. Kappos
*Director of the United States Patent and Trademark Office*